(12) United States Patent
Willeford et al.

(10) Patent No.: US 8,271,987 B1
(45) Date of Patent: Sep. 18, 2012

(54) PROVIDING ACCESS TO TASKS THAT ARE AVAILABLE TO BE PERFORMED

(75) Inventors: James C. Willeford, Seattle, WA (US);
Nicole A. Deflaux, Seattle, WA (US);
Vidya V. Iyer, Seattle, WA (US); Anand Chelian, Seattle, WA (US); Ranganath Atreya, Mercer Island, WA (US); Adam D. Bradley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1415 days.

(21) Appl. No.: 11/832,268

(22) Filed: Aug. 1, 2007

(51) Int. Cl.
*G06F 9/46* (2006.01)
*G06Q 10/00* (2012.01)

(52) U.S. Cl. ....... 718/104; 718/100; 718/102; 705/7.12; 705/7.13; 705/7.14; 705/7.25

(58) Field of Classification Search .................. None
See application file for complete search history.

(56) References Cited

U.S. PATENT DOCUMENTS

| | | | | |
|---|---|---|---|---|
| 5,960,404 | A * | 9/1999 | Chaar et al. | 705/7.26 |
| 6,742,033 | B1 * | 5/2004 | Smith et al. | 709/224 |
| 6,917,960 | B1 * | 7/2005 | Decasper et al. | 709/203 |
| 7,155,400 | B1 * | 12/2006 | Jilk et al. | 705/7.14 |
| 7,747,749 | B1 * | 6/2010 | Erikson et al. | 709/226 |
| 2002/0052773 | A1 * | 5/2002 | Kraemer et al. | 705/9 |
| 2003/0018762 | A1 * | 1/2003 | Mullen | 709/223 |
| 2004/0010539 | A1 * | 1/2004 | Archbold | 709/201 |
| 2004/0088206 | A1 * | 5/2004 | Thompson et al. | 705/7 |
| 2005/0125553 | A1 * | 6/2005 | Wu et al. | 709/233 |
| 2006/0031110 | A1 * | 2/2006 | Benbassat et al. | 705/9 |

OTHER PUBLICATIONS

"The Chord/DHash Project—Chord FAQ" retrieved Jul. 17, 2007, from pdos.csail.mit.edu/chord/faq.html, 4 pages.
"The Chord/DHash Project—Overview" retrieved Jul. 17, 2007, from pdos.csail.mit.edu/chord/, 1 page.
"A Developer's Guide to On-Demand Distributed Computing: Best Practices for Design and Deployment of High-Performance J2EE Applications," Mar. 2004, Akamai, retrieved from www.akamai.com/dl/whitepapers/Akamai_DeveloperGuide_Distributed_Computing.pdf, 12 pages.
"EdgePlatform," Akamai, retrieved Jul. 26, 2007, from www.akamai.com/html/technology/edgeplatform.html, 1 page.
"Network File System," retrieved Jul. 26, 2007, from www.ussg.iu.edu/usail/network/nfs/, 1 page.

(Continued)

*Primary Examiner* — Meng An
*Assistant Examiner* — Bing Zhao
(74) *Attorney, Agent, or Firm* — Seed IP Law Group PLLC

(57) ABSTRACT

Techniques are described for facilitating access of users to tasks that are available to be performed, such as via a task exchange system that serves as an intermediary to facilitate performance by some task performer users of tasks supplied by other task requester users. The techniques may include automatically providing a particular group of task performer users with access to a supply of available tasks that are appropriate for those task performer users, such as based on an aggregate probability or other likelihood measure that the task performer users as a group will collectively accept to perform those tasks in a specified manner. More generally, the affinity and/or appropriateness of a group of users to perform one or more tasks may be based on various information related to the users, including past task performance behavior of those users, and/or qualifications or more general reputational aspects of those users.

39 Claims, 6 Drawing Sheets

OTHER PUBLICATIONS

"Network File System (NFS)," FreeBSD Handbook: Chapter 27 Network Servers, retrieved Jul. 26, 2007, from www.freebsd.org/doc/en_US.ISO8859-1/books/handbook/network-nfs.html, 6 pages.

"Our Goal: To Understand Protein Folding, Misfolding, and Related Diseases," Folding@home, retrieved Jul. 26, 2007, from folding.stanford.edu/, 2 pages.

"What is an Entity Bean?" The J2EE™Tutorial, retrieved Jul. 17, 2007, from java.sun.com/j2ee/tutorial/1_3-fcs/doc/EJBConcepts4.html, 4 pages.

Anderson, D., et al., "SETI@home: An Experiment in Public-Resource Computing," Nov. 2002, *Communications of the ACM*, 45(11):56-61, retrieved Jul. 26, 2007, from setiathome.berkeley.edu/sah_papers/cacm.php, 7 pages.

Carbonado, homepage, retrieved Jul. 17, 2007, from carbonado.sourceforge.net, 3 pages.

Cecchet, E., et al., "C-JDBC: Flexible Database Clustering Middleware," Mar. 2005, ObjectWeb, retrieved Jul. 17, 2007, from jdbc.objectweb.org/current/doc/C-JDBC_Flexible_Database_Clustering_Middleware.pdf, 10 pages.

Chen, P., "The Entity-Relationship Model—Toward a Unified View of Data," Mar. 1976, *ACM Transactions on Database Systems* 1(1):9-36, retrieved Jul. 17, 2007, from bit.csc.lsu.edu/~chen/pdf/erd.pdf, 28 pages.

Dean, J., et al., "MapReduce: Simplified Data Processing on Large Clusters," Dec. 2004, OSDI'04: Sixth Symposium on Operating System Design and Implementation, San Francisco, CA, retrieved Jul. 26, 2007, from 209.85.163.132/papers/mapreduce-osdi04.pdf, 13 pages.

Hibernate.org, Relational Persistence for Java and .NET, retrieved Jul. 17, 2007, from www.hibernate.org/, 3 pages.

Hibernate.org, Product Evaluation FAQ, retrieved Jul. 17, 2007, from www.hibernate.org/263.html, 4 pages.

JBoss.com, "Object and Relational Mapping (ORM) with Hibernate," retrieved Jul. 17, 2007, from www.jboss.com/pdf/HibernateBrochure-Jun2005.pdf, 4 pages.

Karger, D., et al., "Consistent Hashing and Random Trees: Distributed Caching Protocols for Relieving Hot Spots on the World Wide Web," May 1997, (ACM) Symposium on Theory of Computing, retrieved Jun. 19, 2007, from citeseer.ist.psu.edu/cache/papers/cs/2895/http:zSzzSztheory.lcs.mit.eduzSz~kargerzSzPaperszSzweb.pdf/karger97consistent.pdf, 10 pages.

Korpela, E., et al., "SETI@home—Massively Distributed Computing for SETI," Jan./Feb. 2001, *Computing in Science & Engineering*, 3(1):78-83, 6 pages.

ObjectWeb.org, Homepage, retrieved Jul. 17, 2007, from c-jdbc.objectweb.org/, 2 pages.

ObjectWeb.org, "C-JDBC: Scalability and High Availability for your Database," Jan. 2006, retrieved Jul. 17, 2007, from c-jdbc.objectweb.org/current/doc/C-JDBC-Brochure-EN.pdf, 2 pages.

ObjectWeb.org, How does it work?, , retrieved Jul. 17, 2007, from jdbc.objectweb.org/howdoesitwork.html, 1 page.

University of California, "What is SETI@home?," retrieved Jul. 26, 2007, from setiahome.berkeley.edu, 1 page.

Wikipedia, "Object-relational Mapping," retrieved Jul. 17, 2007, from en.wikipedia.org/wiki/Object-relational_mapping, 4 pages.

* cited by examiner

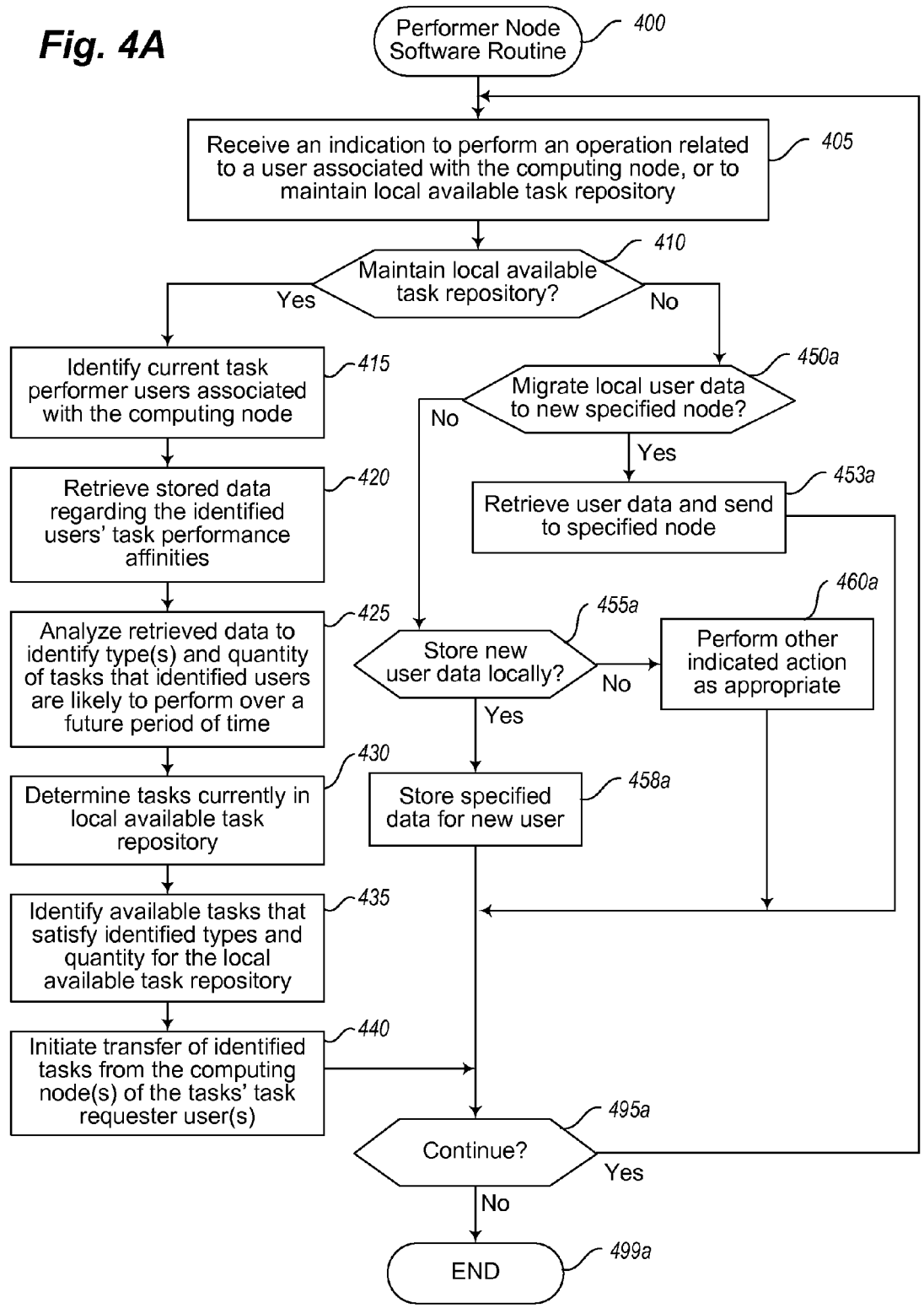

PROVIDING ACCESS TO TASKS THAT ARE AVAILABLE TO BE PERFORMED

TECHNICAL FIELD

The following disclosure relates generally to facilitating access of users to tasks that are available to be performed.

BACKGROUND

As the use of the Internet and the World Wide Web ("Web") has become widespread, it is increasingly common for users to access and use various types of capabilities provided by remote computing systems over the Web, including to search for, shop for and order items (such as products, services and/or information) that are for purchase, rent, lease, license, trade, evaluation, sampling, subscription to, etc. In addition to such user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

While capabilities provided to remote users and other clients provide various benefits, various problems also exist. For example, as the scale of such offerings increases (e.g., to support large numbers of clients), large numbers of computing devices may be needed to store data related to the clients and/or to handle requests from and other interactions with the clients. However, among other potential issues, it can be difficult to manage the storage of data and to coordinate the various computing devices in such situations in order to provide efficient capabilities without significant overhead, such as to make information available to appropriate recipients in an efficient manner.

BRIEF DESCRIPTION OF THE DRAWINGS

FIGS. 4A and 4B illustrate flow diagrams of example embodiments of Node Software routines for performer computing nodes and requester computing nodes.

DETAILED DESCRIPTION

Figure 1:
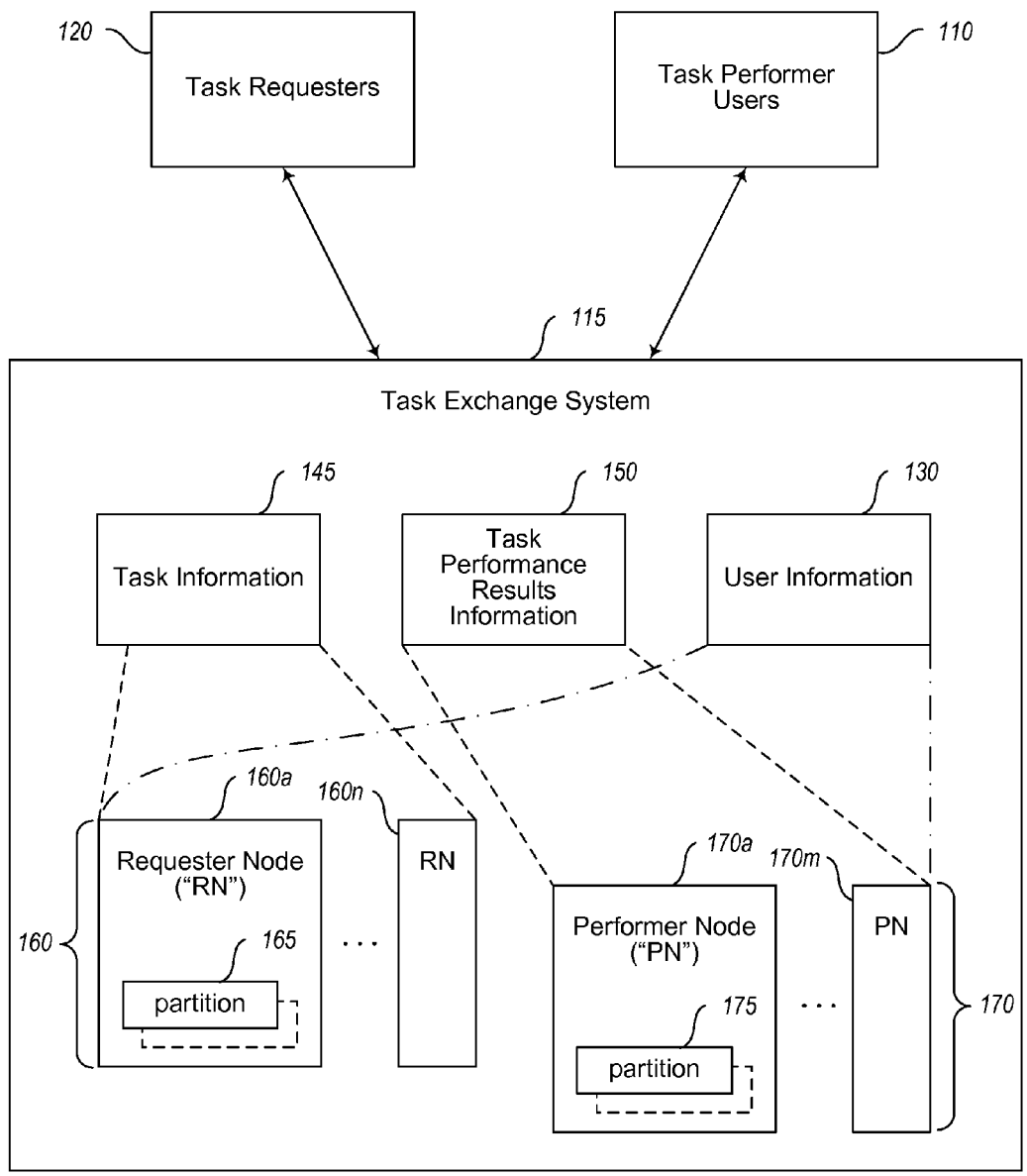
FIG. 1 is a network diagram illustrating an example of users interacting with a remote system that stores various data and provides various types of functionality.

Techniques are described for, among other things, facilitating access of users to tasks that are available to be performed, such as via a task exchange system that serves as an intermediary to facilitate performance by some users of tasks supplied by other users. For example, the users of the task exchange system may include various task requester users who supply tasks of various types to be performed, and various task performer users who perform tasks supplied by task requester users. In at least some embodiments, the task exchange system may provide functionality to users via multiple alternative computing nodes that operate in a distributed manner to each provide functionality to a subset of the users, such as with some of the computing nodes being requester nodes that each provide functionality to one or more task requester users, and other of the computing nodes being performer nodes that each provide functionality to one or more task performer users. In at least some such embodiments, a requester node may store various data for each requester user associated with the requester node, including information about tasks supplied by the requester user that are available to be performed. Similarly, in at least some such embodiments, a performer node may store various data for each performer user associated with the performer node, including information about tasks from task requester users that are currently being performed by the performer user. Additional details related to embodiments of the task exchange system are included below.

In at least some embodiments, the described techniques include automatically providing task performer users with access to a supply of available tasks that are appropriate for those task performer users. The providing of such task access may include, for example, identifying available tasks that are likely to be performed by a particular group of multiple task performer users (e.g., a group of task performer users who are associated with a particular task performer node), and automatically transferring information about those tasks to the task performer node(s) with which the group of users is associated, so that those tasks are available to be later performed by the users of the group. In addition, in some embodiments, a task that is available to be performed may be associated with a single computing node at a time that controls which task performer user(s) perform that task, and if so the automatic transfer of information about a task to a task performer node may include transferring the control over performance of that task to that task performer node (e.g., to temporarily lease or otherwise temporarily grant control over a task from the task requester node with which the task requester who supplied the task is associated).

The automatic identification of appropriate available tasks for a particular group of multiple task performer users, and/or of an appropriate group of task performer users for a particular group of one or more available tasks, may be performed in various manners in various embodiments, including in at least some embodiments by calculating an aggregate probability or other likelihood measure that the task performer users as a group will collectively accept to perform those tasks, such as within a specified period of time. Furthermore, the automatic determination of appropriateness of a group of multiple task performer users for one or more available tasks may in some embodiments be performed by a performer node that pulls or otherwise retrieves task information for some or all of the task performer users who are associated with the performer node, and/or by a requester node that pushes or otherwise sends information about available tasks whose information is stored on the requester node to one or more performer nodes that have associated task performer users who are appropriate to perform the tasks. Additional details related to the described techniques are included below. In addition, in at least some embodiments, the described techniques are automatically performed by embodiments of one or more Node Software components, as described in greater detail below.

FIG. 1 is a network diagram that illustrates an example of users interacting with a remote system that stores various data and provides various types of functionality, with embodiments of such a system able to use various of the described techniques for facilitating access of users to tasks that are available to be performed. In particular, in this example embodiment, the system storing the data is a task exchange system 115 that stores data related to tasks and to users who supply and/or perform the tasks, and that provides functionality related to performance of tasks. For illustrative purposes, some embodiments are described herein in which specific types of users interact with specific types of systems in specific ways, and in which the systems store specific types of data and provide specific types of related functionality, including specific types of techniques that facilitate access of users to tasks that are available to be performed. These examples are provided for illustrative purposes and are simplified for the sake of brevity, and the inventive techniques can be used in a wide variety of other situations, some of which are discussed herein.

The task exchange system 115 may be implemented in various ways in various embodiments, such as in the form of a software system executing on one or more computing systems or devices (e.g., in a distributed manner, such as on a peer-to-peer or grid network). In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the system 115 may enable the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, various task requesters 120 interact with the task exchange system 115 (e.g., by sending requests to the system 115 and receiving corresponding responses as appropriate) in order to supply tasks that are available to be performed by others, as well as to perform other related activities. For example, in addition to supplying tasks, a task requester may interact with the system 115 to obtain results from the performance by other users of previously supplied tasks, to obtain information about an account of the task requester (e.g., information about financial payments made to other users for performing tasks supplied by the task requester, information about previously specified preferences, etc.), to search for information about tasks and/or about users who are available to perform tasks, to specify types of qualifications that users may need to perform supplied tasks, etc. The task requesters 120 may take various forms, such as a task requester user who interactively accesses the system 115 (e.g., via a GUI, or graphical user interface, displayed on a computing system of the task requester user, not shown, such as a GUI based on Web pages provided by the system 115 and/or based on execution of a client-side application on the computing system), or a software application that is programmatically interacting with the system 115 (e.g., via an API of the system 115, not shown) on behalf of a related task requester user.

When a task requester supplies information about one or more tasks, the system 115 stores the task-related data as part of task information 145, which may then be made available to other users to perform the tasks in a manner specified by the task requester or otherwise determined by the system 115. The supplied information for a task may include a variety of types of information, including details related to the task (e.g., information to be analyzed, a question to be answered, etc.), one or more qualifications of any task performer user who performs the task, one or more geographical locations associated with the task, one or more capabilities and/or other current characteristics of one or more devices to be used as part of performing the task, one or more other criteria related to task performance (e.g., deadlines for completion, format of results from task performance, etc.), one or more associated rewards (e.g., monetary payments) to be provided to one or more task performer users who successfully perform the task, etc.

The system 115 stores various data across multiple alternative storage partitions in this example embodiment, such that at least some types of data are stored only on a single partition. In addition, in at least some embodiments, each storage partition is represented by or includes a particular database or other data repository, although the data repositories are not illustrated in this example. In this example embodiment, the system 115 organizes data based on users with which the data is currently associated, so as to store a group of data related to a particular user together on a particular storage partition. Thus, for example, when a particular task requester user supplies information about a new task, the system 115 determines an appropriate storage partition to store the information about the new task along with other information related to the task requester user. If the task requester is an existing user who already has information stored in a particular storage partition on a particular computing node, the system 115 may merely select that existing storage partition. Alternatively, If the task requester user is a new user or otherwise does not currently have an existing associated storage partition, the system 115 may determine an appropriate storage partition by considering one or more of a variety of types of information, such as about possible storage partitions, about the new user, and/or about other users that are related to the user.

In this example, the system 115 includes various alternative computing nodes 160 that store data related to task requester users, including example requester computing nodes 160a and 160n. As illustrated in detail with respect to requester node 160a, each requester node may include one or more storage partitions 165 that each store data related to one or more task requester users. Accordingly, in this example embodiment, the system 115 determines a particular storage partition on one of the requester nodes that corresponds to the particular task requester that supplied information about the new task, such as a first partition 165 on requester node 160a. Furthermore, in this illustrated embodiment, the computing node associated with a storage partition corresponding to a task requester user not only provides storage of data related to the task requester user, but also provides at least some of the system 115 functionality for the task requester user via an executing software program or other software component (not shown), such as to process and respond to various types of requests received from the task requester user. The computing nodes may have various forms in various embodiments, such as to each be a distinct physical computing system, to be one of one or more virtual machines hosted on a physical computing system, to include multiple physical computing systems working in concert, etc. In addition, in other embodiments, storage partitions and/or data repositories may have other forms, such as to be split across multiple computing systems and/or to be provided by dedicated storage devices that do not provide additional computing capabilities.

Thus, when a task requester user supplies information about a new task, the task-related information is in this example embodiment stored together on a single storage partition with at least some other information specific to the task requester user. In this example, the various task information 145 for the system 115 is stored in a distributed manner across the partitions 165 of the requester nodes 160, although in other embodiments such task information may be associated with other users in at least some situations (e.g., to temporarily associate information about a task with a task performer user while the task performer user is performing the task).

As previously noted, various types of information other than about supplied tasks may also be associated with task requester users and grouped together on storage, including information about previous interactions with the user and various administrative information (e.g., contact information, payment-related information, previously specified user preferences, other types of information associated with an account of the task requester user for the task exchange system 115, etc.). Such user information may be supplied by the user and/or generated by the system 115, and is stored as user information 130 by the system 115 in this example. As is illustrated, such user information may be stored by the requester nodes 160 when the user information corresponds to task requester users, but may additionally be stored on task performer computing nodes 170 when the user information corresponds to task performer users. In a manner similar to the requester nodes 160, the system 115 includes various alternative task performer nodes 170 in this example, including performer nodes 170a and 170m. As illustrated in detail with respect to performer node 170a, each performer node may include one or more storage partitions 175 that each includes a data repository storing data related to one or more task performer users.

Thus, when a task performer user 110 submits a request to or otherwise interacts with the system 115, the interaction is handled in a manner similar to that previously described with respect to the task requester users 120. The interaction may be, for example, to initiate performance of a specified task that is supplied by a task requester user, to obtain information about an account of the task performer (e.g., information about financial payments received from other users for performing tasks supplied by those other users, information about previously specified preferences, etc.), to search for information about tasks and/or about other users, to provide information about qualifications of the task performer user that may assist in performing various types of supplied tasks, etc. The task performer users 110 may similarly interact with the system 115 in various ways, such as via a GUI of the system 115 that is displayed on computing devices (not shown) of the task performer user.

As with requests from or other interactions by task requesters, after receiving a request from a particular task performer user, the system 115 determines an appropriate storage partition for the task performer user on one of the performer nodes 170, such as a first partition 175 on performer node 170a. For existing task performer users, a storage partition that already stores data for the task performer user may be quickly determined via retrieval of information from a lookup table or other mapping that maintains information about such associations. For new task performer users, an appropriate storage partition may be selected in a manner similar to that previously discussed for task requester users, such as based on information about the possible storage partitions, about the new user if such information is available, and/or about other users that are related to the user if such information is available. As a specific example, if information is available about types of tasks that the new task performer user has an affinity for performing, the system 115 may desire to store the new user's data on a storage partition that is proximate to one or more storage partitions that store data for task requester users who supply tasks of those types, and/or to store the new user's data on a storage partition that stores data for other task performer users who have an affinity for performing the same types of tasks. Moreover, in embodiments in which at least some nodes may act as both requester nodes and performer nodes (or in which distinctions are not made between requester nodes and performer node, such that there is merely a group of computing nodes that may each store requester-related and/or performer-related data), the data for the new task performer user may be co-located on a particular storage partition with the data for one or more related task requester users who supply types of tasks for which the task performer user has an affinity.

After determining the appropriate storage partition for the task performer user, the system 115 transfers control of handling the task performer user's interaction to the computing node associated with the storage partition. For example, if the interaction is a request by the task performer user to perform a specified task supplied by a task requester user, the computing node associated with the task performer user's storage partition may interact with the computing node associated with that task requester user's storage partition to retrieve information about the task to be performed, such as under control of a software program (not shown) that is executing on the computing node associated with the task performer user's storage partition in order to provide some of the functionality of the system 115. In so doing, in some embodiments, the task and/or the information for the task may be temporarily associated with the task performer user's storage partition while the task is being performed (e.g., by providing the performer node that provides the task performer user's storage partition with a temporary lease or other temporary lock on that task so that the task performer user has the exclusive ability to perform that task for a limited period of time), while in other embodiments the task information may remain associated with the task requester user's storage partition but otherwise provide access to the information for the task performer user. After the task performer user performs the task (which may involve the task performer user supplying information and/or performing offline activities external to the system 115 and the task performer user's computing device), information about the results of the task performance are stored in the task performance user's storage partition, and may be made available to the task requester user in various ways (e.g., by automatically forwarding them to the task requester, supplying them to the task requester when the task requester user requests them, etc.). The aggregate task performance results information from the various task performer users then provides the task performance results information 150 for the system 115.

Figure 2:
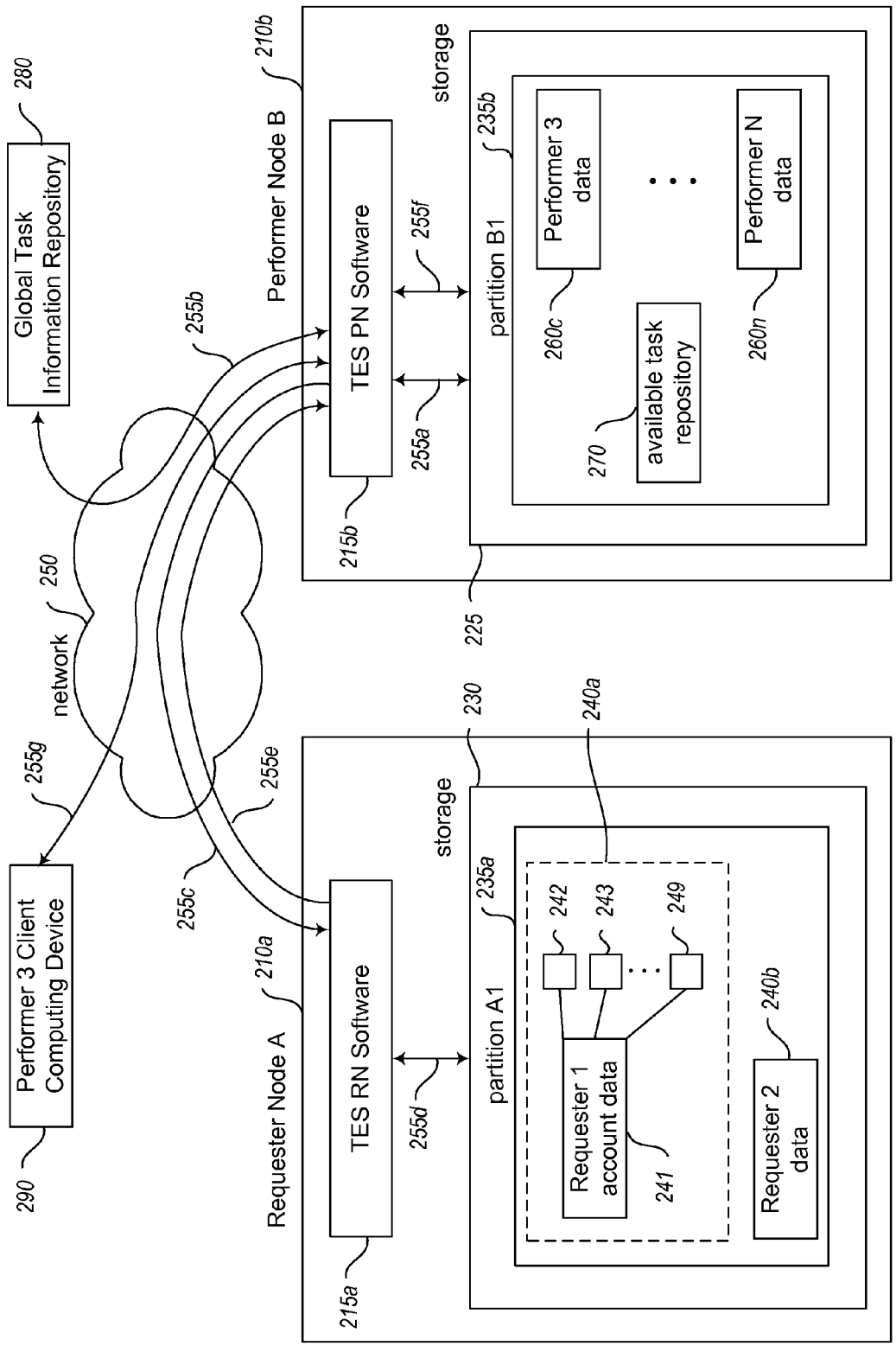
FIG. 2 illustrates an example of interactions to transfer stored data related to tasks that are available to be performed to make the tasks available to selected task performer users who have an affinity for performing those tasks.

Thus, the example system 115 stores various types of data and provides various types of functionality to users, which in this example embodiment are task performer users and task requester users acting as clients of the system 115. FIG. 2 illustrates portions of task exchange system 115 in additional detail, such as to illustrate how computing nodes within the system 115 may in at least some embodiments provide functionality to enable the transfer of tasks and their information between computing nodes so as to facilitate access of users to tasks that are available to be performed.

In particular, FIG. 2 illustrates examples of one of the requester nodes 160 of FIG. 1 and one of the performer nodes 170 of FIG. 1 (shown in FIG. 2 as Requester Node A 210a and Performer Node B 210b, respectively) in additional detail to show example interactions that may occur between them via a network 250 (e.g., a network internal to the system 115). In this example embodiment, requester node 210a includes an executing software program 215a to provide functionality related to the operation of the requester node 210a (e.g., to handle interactions with task requester users and with other computing nodes and computing systems within the system 115), and performer node 210b similarly includes an executing copy 215b of a software program to provide functionality related to the operation of the performer node 210b (e.g., to handle interactions with task performer users and with other computing nodes and computing systems within the system 115). Each of the computing nodes 210a and 210b may be implemented in various ways in various embodiments, as discussed elsewhere, and may include various components that are not illustrated here for the sake of simplicity (e.g., memory and a CPU or other processor to execute software, storage to support one or more data repositories and to store software and other data, various I/O devices, etc.).

As executing software program 215a provides functionality related to the operation of requester node 210a, the software program may access a data repository that is provided by or otherwise associated with the node 210a, such as to store data related to task requester users who are affiliated with the node 210a and/or to retrieve stored data related to such task requester users. In this example, the requester node 210a includes a storage partition A1 235a to store data related to task requester users affiliated with node 210a, and the performer node 210b similarly includes a storage partition B1 235b to store data related to task performer users affiliated with node 210b. While not illustrated here, in some embodiments the storage partitions may be provided by different types of underlying data repositories, such as with the storage partition A1 235a being implemented as part of a relational database data repository on node 210a, and with storage partition B1 235b being implemented as part of a file system data repository on node 210b. It will be appreciated that a variety of other types of data repositories may be used to store data related to users and other entities in other embodiments.

In the example illustrated in FIG. 2, the performer node 210b has multiple associated task performer users, including task performer users Performer 3 through Performer N. Each task performer user has a group of associated data 260 stored in the partition 235b on storage 225 of node 210b, including group 260c for Performer 3 and group 260n for Performer N, such as to reflect various information about available tasks that are currently assigned to the task performer user for performance (e.g., while the task performer user is actively working on the task, or for a short duration during which the task performer user has the exclusive opportunity to work on the task), as well as about prior interactions of the task performer user with the system 115 (e.g., information about tasks previously performed by the task performer user; information about qualifications previously earned by or asserted for the task performer user; information about preferences previously specified by the task performer user; information about an account of the task performer user with the system 115, such as administrative contact information for the user and compensation earned by the user for previously performed tasks; etc.).

The requester node 210a similarly has multiple associated task requester users in this example, including task requester users Requester 1 and Requester 2. Each task requester user has a group of associated data 240 stored in the partition 235a on storage 230 of node 210a, including group 240a for Requester 1 and group 240b for Requester 2, such as to reflect various information about available tasks that have been submitted by the task requester user and are available for performance, but have not yet been assigned to particular task performer users for performance. The various stored information for a task requester user may further include information about prior interactions of the task requester user with the system 115 (e.g., information about tasks previously supplied by and performed for the task requester user; information about qualifications previously granted to particular task performer users; information about preferences previously specified by the task requester user; information about an account of the task requester user with the system 115, such as administrative contact information for the user, a current balance of money owed to task performer users for performing previously supplied tasks, and financial account information for use in paying task performer users; etc.). In this example, the data group 240a for Requester 1 is shown in greater detail, with various distinct data elements of various types within the data group being shown, including one or more data elements 241 that store account data, and various other data elements 242-249. While the numbers of computing nodes and users are minimized in this example for the sake of simplicity, in some embodiments there may be, for example, thousands of users associated with some or all computing nodes, and with hundreds of those associated users being actively interacting with or otherwise participating in the task exchange system at a single time.

The various computing nodes of the system 115, including requester node 210a and performer node 210b, may interact in various ways. For example, task performer user Performer N may use a client computing device (not shown) to interact with node 210b to search for information about available tasks of interest (e.g., tasks having particular attributes specified by Performer N), to preview information about a particular task that Performer N may be interested in accepting for performance, and to request that a particular available task be assigned to Performer N for performance by Performer N. In response to a request from Performer N to search for information about available tasks of interest and/or preview a particular task of interest, the software program or other software component 215b on node 210b may initiate interactions with one or more other computing nodes or other components of the system 115 to obtain the information and provide it to Performer N. In this example embodiment, the system 115 maintains a single global repository 280 that includes at least some information about available tasks, and thus the software 215*b* can obtain the information about the available tasks of interest by interacting with that repository 280. For example, the global repository may store information about one or more types of tasks that a particular requester computing node has available and about a quantity of tasks of each of the types that are available from the requester computing node, but not details about specific available tasks—in such embodiments, if the software component 215*b* on node 210*b* is searching for tasks of one of those types, it may indicate to Performer N that tasks of that type are available, but not obtain and/or provide details about particular tasks until Performer N requests that information. In addition, in some embodiments, the information initially provided to Performer N about whether tasks of a particular type are available may include additional details, such as an indication of a quantity of tasks of that type (whether a quantity available from a particular requester computing node, or from all requester computing nodes with tasks of that type), an indication of particular requester computing nodes that have tasks of that type available, etc. In other embodiments that do not include such a global repository, the software 215*b* could instead obtain such information in other manners, such as by directly interacting with some or all of the requester computing nodes to obtain information about tasks that are available from the task requester users associated with those requester computing nodes. If Performer N requests to perform a particular available task that is available from Requester 1 on node 210*a*, the software 215*b* interacts with software 215*a* on computing node 210*a* to obtain information about that task. The task information is then stored in partition 235*b* on node 210*b* as part of the group of data 260*n* for Performer N, such as temporarily while Performer N is temporarily assigned the task for performance.

Furthermore, in the illustrated embodiment, each task has a designated number of task performer users who are authorized to perform the task (e.g., one, or multiple if the results from performing the task are to be determined by combining or aggregating the multiple results, such as to take an average of multiple results or to use a result that is common to a majority of the multiple results), and has an associated computing node that controls performance of the task in order to ensure that the authorized number of task performer users perform the task. Thus, for example, if the particular available task that is available from Requester 1 on node 210*a* is designated to be performed by one task performer user, and Performer N requests to perform the task, node 210*a* may control the performance of the task by authorizing Performer N to perform the task and transferring the task to node 210*b* for such performance. The transfer may, for example, include providing a temporary assignment for the task to Performer N or other temporary transfer of control to node 210*b*, such as to provide a temporary exclusive opportunity for Performer N to perform the task for a limited period of time (e.g., 60 minutes, 1 minute, etc.). If Performer N returns the task without performing it or otherwise does not perform the task within the temporary period, node 210*b* may rescind the temporary transfer of the task and re-acquire control of the task, so that another task performer user may be authorized to perform the task.

Thus, in the illustrated embodiment, the software programs 215*a* and 215*b* may interact in order to facilitate access of task performer users to available tasks that the task performer users request to perform. Furthermore, in at least some embodiments, the software programs 215*a* and/or 215*b* may further interact to facilitate access of task performer users to available tasks in other manners, including to maintain a supply of available tasks that are appropriate for a group of task performer users before the task performer users request or otherwise indicate those available tasks, so that such tasks are accessible to those task performer users when they do request or otherwise indicate to perform tasks. Such maintenance of a local supply of available tasks for a group of task performer users provides various benefits, such as improved locality of reference when accessing tasks (e.g., in a temporal, geographical/spatial, and/or sequential manner). The described techniques for facilitating access of users to available tasks may be performed for various reasons, such as to maximize or otherwise increase throughput of tasks for the task exchange system or to otherwise optimize overall performance of the task exchange system, to maximize or otherwise benefit performance of tasks by task performer users to whom task access is facilitated, to maximize or otherwise benefit performance of tasks supplied by task requester users whose tasks received facilitated access, to maximize or otherwise enhance the experience of task requester users and/or task performer users when interacting with the task exchange system, etc.

FIG. 2 illustrates one example of such interactions to facilitate access of task performer users to a supply of appropriate available tasks. In particular, in the illustrated embodiment, the software component 215*b* on performer node 210*b* maintains a repository 270 of available tasks on partition 235*b* that are accessible to the task performer users 260 who are associated with node 210*b*, but not yet assigned to any of the task performer users 260 for performance. In this example, the software component 215*b* repeatedly maintains the supply of available tasks in the repository 270, such as on a periodic basis (e.g., every 5, 15, or 60 minutes) or when initiated in another manner (e.g., if the quantity of available tasks in the repository 270 falls below a minimum predefined threshold).

To create or maintain the supply of available tasks in the repository 270, the software component 215 first performs one or more interactions 255*a* with the partition 235*b* to retrieve information about the performer users 260 for use in determining which available tasks should be present in the repository 270, such as by identifying tasks that the performer users 260 collectively as a group have an affinity to perform. In particular, in at least some embodiments, the component 215*b* may attempt to determine target task information for use in identifying tasks that the performer users 260 will likely perform collectively as a group over a future period of time (e.g., 15, 30 or 45 minutes, 1 hour, 1 day, etc.), including a quantity of tasks and one or more types of tasks. The determination of the target task information may include, for example, retrieving information about past interactions of the performer users 260 with the system 115, including information about previous performance of tasks by the performer users 260 and/or information about preferences previously specified by the performer users 260 (e.g., preferences regarding types of tasks of interest; preferences regarding times at which the performer user is interested in performing tasks, such as times-of-day, days-of-week, days-of-month, etc; preferences regarding how many tasks the performer user is interested in performing, such as an average pace, or a minimum and/or maximum quantity of tasks per period of time or for each interactive session of the performer user with the system 115; etc.). To automatically determine target task information for the group of performer users 260, the component 215*b* may, for example, determine a quantity of tasks that are appropriate for the group of performer users 260 for a future period of time, such as based on an expected collective pace of performance of tasks by the group of performer users 260 (e.g., based on a historical task performance pace of those performer users 260 and/or specified preferences or other specified intentions of the performer users 260 regarding performance of tasks during the future period of time). In addition, the component 215b may determine one or more types of tasks that are appropriate for the group of performer users 260 for a future period of time, such as based on expected tasks that will be collectively performed by the group of performer users 260 (e.g., based on types of tasks historically performed by those performer users 260 and/or specified preferences or other specified intentions of the performer users 260 regarding performance of tasks during the future period of time). Additional details regarding determination of target task information for a group of performer users are described elsewhere.

In the illustrated embodiment, the component 215b bases its information about tasks that are to be acquired at least partially on the determined target task information. In addition, if acting to maintain an existing repository 270 that has currently accessible tasks, the software component 215b also performs one or more interactions 255a with the partition 235b to determine the available tasks that are currently in the repository 270, so as to also base its information about other additional tasks to be acquired to reflect the already present tasks. In some embodiments, the component 215b may further determine that some or all of the available tasks in the repository 270 do not satisfy the current target task information, and if so may transfer those tasks back to the task requester computing nodes from which those tasks were acquired, such as by releasing a temporary lock on those tasks. Furthermore, if tasks had been temporarily acquired for the repository 270 but the temporary period has expired without the tasks being performed, the component 215b may identify those tasks so that they may be removed from the repository 270 or an attempt may be made to re-acquire those tasks for an additional period of time.

After determining the information about tasks that are to be acquired, the component 215b initiates one or more interactions 255b with the global task information repository 280 to obtain information about available tasks that satisfy the determined information, such as based on information in the global task information repository that indicates particular requester computing nodes having available tasks of one or more determined types (or having available tasks with associated metadata corresponding to one or more other determined criteria for the tasks to be acquired) and that indicates particular requester computing nodes having available tasks of a determined quantity. In this example, one or more such tasks are available on the requester computing node 210a from one of the task requester users associated with the node 210a. Accordingly, the component 215b then initiates one or more interactions 255c with the component 215a on computing node 210a to indicate some or all of those one or more tasks on the computing node 210a and to request that the indicated tasks be transferred to computing node 210b, such as to provide control over those tasks to component 215b so that the group of task performer users 260 have exclusive access to perform those transferred tasks (e.g., for a temporary period that corresponds to a temporary lock on those tasks, or instead for an unlimited period of time until the tasks are performed or returned for performance by other task performer users). In other embodiments, information about the indicated tasks may be provided to computing node 210b but without transferring the tasks so as to provide control to component 215b, such as to allow the group of task performer users 260 to perform the tasks but to also allow other task performer users to perform the task (e.g., on a first-come, first-served basis). In at least some embodiments, the interactions 255c may be performed in a similar manner to that previously described when Performer N requested to perform a particular task from Requester 1, but without providing any information about the group of performer users 260, while in other embodiments the interactions 255c may include providing some information about the group of performer users 260 (e.g., their identities, their individual qualifications, aggregate summaries of the group, etc.).

In response to the interactions 255c, the component 215a performs one or more interactions 255d with the partition 235a to obtain information about the indicated tasks. In some embodiments, the component 215a may determine whether to transfer the indicated tasks to computing node 210b, such as based on information about the group of performer users 260 and/or about the indicated tasks, while in other embodiments the component 215a may perform the requested transfer without such a determination. Furthermore, in embodiments in which tasks are transferred in such a manner as to provide exclusive access to the recipient computing node, such as via a temporary lock on the tasks, the interactions 255d may further include establishing a lock on the stored information about the indicated tasks such that other task performer users do not have access to perform those tasks while the lock is in effect. In the illustrated embodiment, the component 215a then proceeds to perform one or more interactions 255e with the component 215b in order to transfer the indicated tasks to computing node 210b, so that the group of task performer users 260 have at least temporary exclusive access to perform those indicated tasks. The component 215b then stores the information for the transferred tasks in the available task repository 270 via one or more interactions 255f with the partition 235b.

While illustrated here with respect to only requester computing node 210a, it will be appreciated that the component 215b may further interact with various other requester computing nodes in order to similarly acquire available tasks for the available task repository 270 from those requester computing nodes. Alternatively, in other embodiments, access to available tasks may be controlled by a single centralized component (e.g., the global task information repository 280) rather than in a distributed manner by the various requester computing nodes, and if so the component 215b may instead interact with that single centralized component to acquire the available tasks for the available task repository 270. Furthermore, it will be appreciated that in some embodiments and situations, the information obtained from the global task information repository 280 during the interactions 255b may identify more available tasks or fewer available tasks than a determined quantity to be acquired, and if so the component 215b may respond in various ways. For example, if too few tasks are available, the component 215b may attempt to acquire only those available tasks, or may instead attempt to identify and acquire additional tasks (e.g., tasks that are similar to the originally identified tasks, but for which the affinity of the task performer users is lower). Conversely, if too many tasks are available, the component 215b may attempt to acquire only a subset of those available tasks to correspond to the determined quantity (e.g., to reflect the available tasks for which the task performer users 260 have the highest affinity; to reflect other attributes of the selected tasks, such as those tasks that have the longest time until a completion deadline or a longest temporary lock time; by selecting the subset randomly; etc.), or may instead attempt to acquire all of the identified available tasks. In at least some embodiments, the quantity of tasks to be acquired by a performer computing node may be automatically selected in such a manner as to maximize or otherwise increase throughput of overall performance of tasks for the task exchange system. For example, the selected quantity may be the largest quantity of tasks that the group of task performer users associated with the performer computing node will likely perform over a particular future period of time, or some predefined percentage or other subset of such a largest quantity. In addition to enhancing the performance of tasks, the selection of an appropriate quantity of tasks to be acquired and managed together as a group may also provide other benefits, such as to minimize network traffic between performer nodes and requester nodes that would otherwise occur if such nodes interacted on a per-task basis to exchange information and manage control over task performance.

At some time after the available tasks are acquired from the computing node 210a and stored in the available task repository 270, task performer user Performer 3 initiates one or more interactions 255g with the system 115 in order to identify and perform one or more tasks, and is directed to performer computing node 210b with which Performer 3 is associated. For example, Performer 3 may initiate one or more requests to search or browse for available tasks or to preview information about a task, and the component 215b may respond to the requests by providing information about one or more available tasks that include one or more of the tasks stored in the available task repository 270. Furthermore, in at least some embodiments and situations, the component 215b may respond to Performer 3 with information about available tasks that is biased to reflect those tasks that are accessible via the available task repository 270, whether with or without Performer 3 being aware of the available task repository 270 and/or of the biased response. For example, the information provided to Performer 3 may favor tasks accessible via the available task repository 270, such as by excluding or de-emphasizing other available tasks. Alternatively, in some situations, the component 215b may disfavor tasks accessible via the available task repository 270 when providing information to Performer 3, such as if those disfavored tasks are more appropriate for other of the task performer users 260 and are being saved for them, or if the available tasks in the task repository 270 are being performed by the task performer users 260 at a faster pace than expected and may not be replenished for a time.

In this example, Performer 3 selects to perform one of the available tasks from the task repository 270 that was previously acquired by component 215b, and thus the component 215b controls the performance of that task by Performer 3 in this example. In other embodiments in which computing node 210a did not transfer that task to computing node 210b, the component 215b may instead interact with computing node 210a to obtain authorization for Performer 3 to perform the task, such as in a manner previously described with respect to Performer N requesting to perform a particular task from Requester 1. If Performer 3 successfully performs the task, it is removed from the repository 270, and the results of the task performance are returned to component 215a on computing node 210a for storage in partition 235a.

Thus, by interacting to exchange information about and transfer control over tasks, the software programs 215 may operate in a distributed manner and facilitate access of task performer users to tasks that are available to be performed. For example, by enabling performer computing nodes to facilitate access of associated task performer users to available tasks in a distributed manner, the task exchange system may have significantly improved scalability relative to a system that attempts to facilitate such task access in a centralized or other non-distributed manner. In addition, scalability may be further improved in at least some embodiments by selecting appropriate sizes of groups of tasks to acquire for particular performer computing nodes, as discussed elsewhere, such as to minimize network traffic when requester and performer computing nodes interact to obtain information about tasks to be performed and/or about results of performed tasks.

Furthermore, in other embodiments, the facilitating of the access of task performer users to tasks that are available to be performed may include other actions. For example, the interactions 255a and the corresponding determination of target task information may not be performed each time that the component 215b attempts to acquire available tasks for the repository 270, such as if the task performer users 260 and/or their task performer behavior has not changed significantly (or at all) since a prior time that the target task information is determined. In addition, while example illustrated in FIG. 2 involves different types of computing nodes for task requester users and task performer users, with node software components on those nodes that perform different types of functionality to correspond to those types of users, in other embodiments some or all of the computing nodes of the task exchange system may instead have associated users that include both task requester users and task performer users. If so, such computing nodes with both types of associated users may provide functionality to those associated users that corresponds to both of the components 215a and 215b, whether by having two such components or instead having a single component that provides both types of functionality.

Furthermore, in some embodiments, user access to available tasks may be further facilitated by transferring selected users from their current associated computing nodes to one or more new associated computing nodes, such as to group related task performer users together (e.g., to group together task performer users that share an affinity for performing particular types of tasks, to group together task performer users that share common qualifications and/or ability levels for performing particular types of tasks, etc.). As one specific example, the task exchange system may attempt to create one or more "hot spots" that each have a group of task performer users who share particular proficiency and interest in performing one or more particular types of tasks, so that a supply of available tasks of those types may be gathered and maintained at that hot spot for rapid and accurate performance by those task performer users. Such hot spots provide various other advantages as well, including providing a supply of backup or replacement task performer users for a particular task that is initially assigned to a task performer user who declines or fails to timely perform the task.

As noted, a determination may be made to transfer data for a user or other entity from a current storage partition to a different storage partition at various times and for various reasons, including to enhance overall performance of the task exchange system. For example, in some embodiments the transfer of entity-related data may be performed if a current storage partition or computing node is over-utilized (e.g., based on levels of usage of memory, storage, network bandwidth, I/O access, etc.) and/or the new storage partition or computing node is under-utilized, or such as if the new storage partition is more proximate to other data that the entity may access. If areas of over-utilization and/or under-utilization are detected, they may be corrected in various ways. As one example, users with similar usage patterns may be grouped together, such as to group users with CPU-intensive or memory-intensive usage patterns on computing nodes that have enhanced capabilities in those areas. As another example, users with complementary usage patterns may be grouped together, such as to group a first user with a CPU-intensive usage pattern with a second user with an I/O access-intensive usage pattern, so that different users are consuming different resources of a single computing node. Moreover, users may be grouped in a variety of other ways, such as to match users with differing usage patterns based on time-of-day, day-of-week, etc. In addition to grouping users based merely on usage patterns and on resource capabilities of computing nodes, various other factors may be considered in at least some embodiments when determining whether to migrate a user's data from a current storage partition to a new storage partition.

In some embodiments, when retrieving or storing data from a partition, including to transfer data related to a user or other entity between multiple computing nodes, the software components 215a and/or 215b may use a common interface for interacting with different types of data repositories and may perform a variety of additional activities, as described in greater detail in U.S. application Ser. No. 11/780,323, filed Jun. 19, 2007 and entitled "Providing Entity-Related Data Storage On Heterogeneous Data Repositories," which is incorporated herein by reference in its entirety. Furthermore, additional details related to example embodiments of transferring user data between computing nodes are included in U.S. application Ser. No. 11/763,976, filed Jun. 15, 2007 and entitled "Providing Enhanced Access To Stored Data," which is incorporated herein by reference in its entirety.

Furthermore, in the example illustrated with respect to FIG. 2, the software component 215b on the performer computing node 210b initiated the transfer of available tasks to the computing node 210b in order to maintain the available task repository 270, such as to benefit the group of task performer users 260 associated with the computing node 210b by facilitating access to a supply of available tasks that are appropriate for those task performer users. In other embodiments, access to tasks may be facilitated in other manners. For example, in some embodiments, the software component 215a on the requester computing node 210a may initiate the transfer of available tasks that are supplied by the task requester users 240 who are associated with the computing node 210a, whether to benefit the group(s) of task performer users to whom the available tasks are transferred and/or to benefit the task requesters users (e.g., by facilitating performance of the tasks by one or more groups of task performer users selected by the component 215a, such as to have the tasks performed in a timely manner and/or by task performer users who meet certain additional criteria specified by the task requester users, such as task requester users who have historically performed related tasks at a desired level of proficiency). Such additional task access facilitation techniques by the software component 215a on the requester computing node 210a may be performed instead of or in addition to the task access facilitation techniques that were previously described with respect to the software component 215b on the performer computing node 210b. When the additional task access facilitation techniques by the software component 215a on the requester computing node 210a are performed in addition to the task access facilitation techniques that were previously described with respect to the software component 215b on the performer computing node 210b, the task exchange system may in a distributed manner achieve results similar to those of a centralized scheduler component with global knowledge that attempts to optimize performance by all task performer users of all tasks supplied by all task requester users, but without the substantial overhead involved in attempting to create and maintain such a centralized scheduler component.

As one example of the additional task access facilitation techniques that may be performed by the software component 215a on the requester computing node 210a, the software component 215a may determine whether to transfer some or all available tasks supplied by the task requester users 240, such as periodically (e.g., every 5, 15, or 60 minutes), upon receiving new available tasks supplied by the task requester users 240, or if the available tasks have not otherwise been selected to be performed after a certain period of time has passed. To do so, the component 215a may retrieve information about the various available tasks that are currently controlled by the computing node 210a, such as by retrieving the information from the various stored information for the requester users 240. The component 215a may then select all of the available tasks to be transferred, or may instead analyze information about the available tasks so as to select some or all of the available tasks that satisfy specified criteria (e.g., based on the type of the task, time elapsed since the task was supplied, time remaining to perform the task, etc.).

The component 215a may also retrieve information about task performer users in order to identify task performer users who are appropriate to perform the selected available tasks (or sub-groups of the selected available tasks), such as task performer users who have an affinity for performing such tasks and/or who are sufficiently proficient at performing such tasks. In some embodiments, groups of task performer users that are candidates to perform the selected available tasks may be identified based on the various task performer users associated with some or all of the various performer computing nodes of the task exchange system. The information about the task performer users may be obtained in various ways, such as by analyzing information about task performer users who have previously performed tasks for the task requester users 240, by retrieving information about task performer users from a global repository of such information (if one exists), by retrieving information about task performer users from some or all of the performer computing nodes by obtaining information about the task performer users associated with those computing nodes, etc. Furthermore, various criteria may be used when evaluating groups of task performer users, including success at past performance of related tasks (e.g., tasks of the same type), volume of past performance of related tasks, longevity of past performance of related tasks, qualifications of the users, reputational factors of the users (e.g., related to general timeliness or quality of work), etc.

In some embodiments, particular hot spots may have been created (by transferring users to or otherwise grouping users together at particular computing nodes) or may have otherwise occurred, and if so the component 215a may attempt to identify a particular hot spot for the selected available tasks (or may select particular available tasks that correspond to such hot spots). For example, the task performer users 260 on computing node 210b may be a hot spot for the types of tasks that task requester user Requester 1 typically supplies, and if so may be selected for the subset of available tasks on partition 235a that were supplied by Requester 1. In addition, it will be appreciated that multiple alternative groups of task performer users may in some situations be identified for a particular group of one or more selected available tasks, and if so one or more of those task performer user groups may be selected for those selected available tasks in various ways (e.g., by selecting the group of task performer users with a highest affinity for performing those selected available tasks; by splitting those selected available tasks among the multiple alternative task performer user groups, such as equally or in proportion to an expected pace that the task performer user groups will collectively perform those selected available tasks; etc.).

After identifying a group of task performer users for the selected available tasks (or a distinct group of task performer users for each of multiple sub-groups of the selected available tasks), the component 215a may initiate a transfer of those selected available tasks to the one or more computing nodes with which the identified group of task performer users is associated. The transfer of the tasks may be performed in various ways, including in a manner similar to that previously described for the transfer of tasks initiated by the component 215b on computing node 210b. In some embodiments, the tasks transferred to a performer computing node will be stored in an available task repository on that performer computing node, such as available task repository 270 on performer computing node 210b. Furthermore, in some embodiments the initiation of the transfer of available tasks to a performer computing node may include interactions to determine whether the performer computing node accepts the tasks, while in other embodiments the tasks may be transferred without such interactions. In addition, in some embodiments information about the selected available tasks may be provided to a selected group of task performer users, but control over performance of those selected available tasks may remain with the requester computing node 210a and the component 215a.

As previously discussed, the affinity and appropriateness for a group of task performer users to perform one or more tasks may be evaluated in various ways in various embodiments, including in some embodiments based at least in part on calculating an aggregate probability or other likelihood measure that the task performer users as a group will collectively accept to perform those tasks (e.g., within a specified period of time, or before any performance deadlines for the tasks expire). In other embodiments, one or more other measures may be used to determine the affinity and/or appropriateness for a group of task performer users to perform one or more tasks, whether instead of or including the aggregate probability of task performance acceptance, such as by calculating an aggregate probability that one or more task requesters users who submitted multiple available tasks will as a group collectively accept the results of performance of those tasks by that group of task performer users, or by otherwise calculating an aggregate probability that the task performer users as a group will collectively perform those tasks in a sufficiently proficient manner as to satisfy one or more specified task performance criteria. As previously discussed, an aggregate probability of task performance acceptance or other related task performance measure for a group of task performer users and one or more available tasks to be performed may be determined in various ways in various embodiments, including based on historical performance by those task performer users and/or similar task performer users of related tasks (e.g., tasks of the same or similar types), indicated task performance preferences of those task performer users, indicated intentions to perform tasks by those task performer users (e.g., during a particular future period of time), etc. In addition, in some embodiments one or more task performer users' historical task performance (or other information about other prior interactions of the users with the task exchange system) may be considered with respect to only selected periods of time, such as to consider only prior interactions that occurred within a recent period of time of specified length (e.g., if a user's recent interactions are considered to be the most representative of the user's current or near-term interactions). Furthermore, in some embodiments, facilitating access of a group of task performer users to a supply of available tasks before those users request to perform the tasks may be performed only if sufficient historical information is available regarding relevant prior interactions of the users with the task exchange system.

In addition, as previously noted, in some embodiments a group of task performer users may be selected based on some or all of the task performer users associated with a particular computing node. In some embodiments, when selecting a particular group of task performer users associated with a computing node to perform one or more tasks during a future period of time (e.g., beginning at the current time and extending a determined amount of time into the future), the group will include all task performer users associated with the computing node, while in other embodiments the group will include only task performer users who are currently interacting with or otherwise participating in the task exchange system (e.g., based on task performer users who are currently logged in, if task performer users need to do so to perform tasks and/or to receive payment or other credit for performing tasks) and/or who are expected to interact with or otherwise participate in the task exchange system during some or all of that future period of time (e.g., based on explicitly indicated intentions of the task performer users regarding some or all of that future period of time, based on historical patterns of when particular task performer users interact with the task exchange system, etc.). For example, it may be beneficial to consider only task performer users who are currently interacting with or otherwise participating in the task exchange system if the future period of time is short (e.g., 5 minutes, 30 minutes, etc.), such that the current task performer users are likely to be substantially representative of the task performer users who will be performing tasks during that future period of time. Similarly, while in some embodiments tasks are selected for inclusion in an available task repository based at least in part on a deadline for performing the task, such a factor may not be considered in at least some embodiments and situations, such as if the future period of time begins substantially immediately and/or is short.

In the example embodiments described with respect to FIGS. 1 and 2, the techniques for facilitating access to data of interest are provided and used by a task exchange system. By enabling large numbers of unaffiliated or otherwise unrelated task requesters and task performers to interact via the intermediary task exchange system in this manner, free-market mechanisms may be used to efficiently perform tasks with location-based and/or device-based criteria regarding task performance. Additional details related to examples of interactions of users with particular embodiments of task exchange systems are included in commonly-owned U.S. patent application Ser. No. 10/990,949, filed Nov. 16, 2004 and entitled "Providing an Electronic Marketplace to Facilitate Human Performance of Programmatically Submitted Tasks," now U.S. Pat. No. 7,945,469, and in pending commonly-owned U.S. patent application Ser. No. 11/396,286, filed Mar. 31, 2006 and entitled "Facilitating Content Generation Via Messaging System Interactions," each of which is hereby incorporated by reference. Nonetheless, it will be appreciated that the described techniques may further be used with a wide variety of other types of systems and in other types of situations, including with types of data that is not related to tasks.

Figure 3:
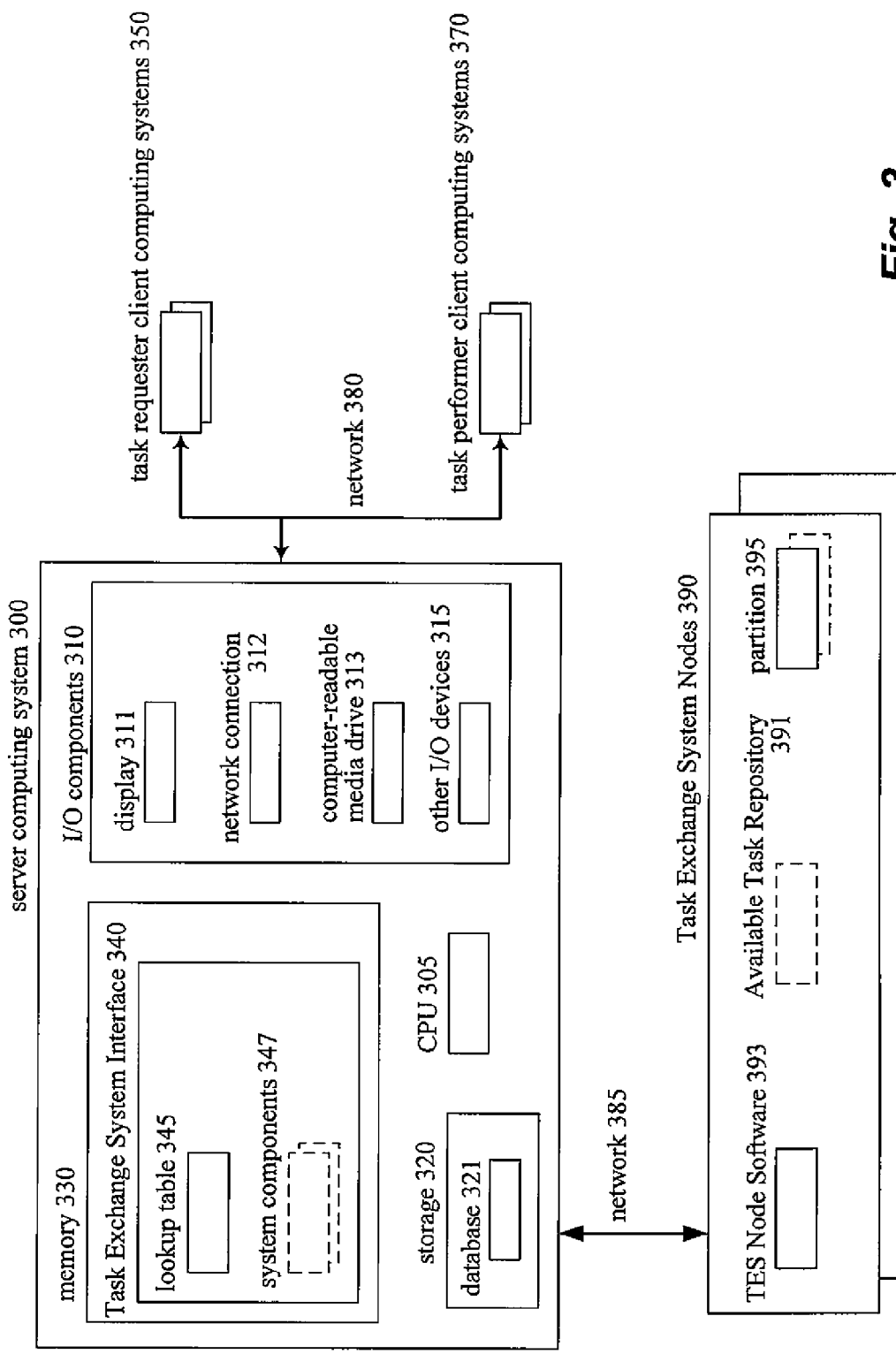
FIG. 3 is a block diagram illustrating an example computing system suitable for executing an embodiment of a software system for facilitating access to tasks that are available to be performed.

FIG. 3 is a block diagram illustrating example computing systems suitable for performing techniques for facilitating access of users to tasks in various situations. In particular, FIG. 3 illustrates a server computing system 300 suitable for executing an embodiment of an interface to a task exchange system, as well as various task requester client computing systems 350, task performer client computing systems 370, and other computing nodes 390 that support the task exchange system. In the illustrated embodiment, the server computing system 300 has components that include a CPU 305, various I/O components 310, storage 320, and memory 330. The I/O components include a display 311, a network connection 312, a computer-readable media drive 313, and other I/O devices 315 (e.g., a mouse, keyboard, etc.). The other computing systems 350 and 370 and the computing nodes 390 each may include similar components to those of the server computing system, but are not illustrated in detail here.

An embodiment of an interface portion of a task exchange system 340 is executing in memory, and it interacts with the client computing systems 350 and 370 over a network 380 using the network connection 312 (e.g., via the Internet and/or the World Wide Web, cellular network, etc.). In particular, users of task requester client computing systems 350 may interact with the system interface 340 in order to provide information about available tasks to be performed, as well as to perform other related interactions. Similarly, task performer users may use task performer computing systems 370 to interact with the system interface 340 to obtain information about available tasks and provide task performance results information, as well as to perform other related interactions.

As previously described, for at least some interactions initiated by the client computing systems 350 and 370 on behalf of users, the system interface 340 responds by identifying a computing node of the task exchange system with which the user is associated, and then directs that associated computing node to handle the interaction. In particular, in this example, the server computing system 300 is connected to multiple task exchange system alternative computing nodes 390 via another network 385 (e.g., a network internal to the task exchange system, such as if the computing nodes 390 are not directly accessible to external computing systems such as computing systems 350 and 370). Each of the alternative computing nodes 390 is capable of providing the same types of functionality in this example embodiment (e.g., capable of handling the same types of user requests), and includes at least one storage partition 395 to store data for one or more types of users, with each storage partition supported by an underlying data repository (not shown). In addition, in this example embodiment, the task exchange system maintains a mapping of users to their associated computing nodes (or to an associated storage partition on one of the computing nodes), with the mapping information being stored in this example in a lookup table 345 on memory 330 to facilitate retrieval of the information. Thus, when an interaction is initiated on behalf of an existing user, the system interface 340 uses the lookup table 345 to identify the particular computing node and/or storage partition for the user, and directs the user's request to the computing node that provides that storage partition. For new users or other users who do not have an associated computing node, the system interface 340 may determine an appropriate computing node (or storage partition) in various ways (e.g., based on excess storage and/or computing capacity of the computing node; based on a measure of locality of the user's computing device to the computing node; in such a manner as to distribute new users among the various computing nodes and storage partitions, such as by random, via round robin, or via consistent hashing; etc.). While not illustrated in detail here, in some embodiments the computing nodes 390 may instead be of varying types (e.g., separated into requester nodes and performer nodes, such as to support different types of functionality corresponding to those types of users; separated by offering different types or levels of capabilities, such as if some computing nodes support higher levels of quality of service and/or include additional capabilities for use by premium customers; separated by the type of data repository that the computing node provides; etc.).

When one of the computing nodes 390 is directed to handle an interaction with a user, or in response to other types of events, one or more software programs or other components 393 executing on that computing node may perform various actions in response. For example, as discussed in greater detail elsewhere, a component 393 may store data related to the user in and/or retrieve data related to the user from a storage partition 395 on the computing node. Furthermore, as discussed in greater detail elsewhere, at least some of the computing nodes 390 that have one or more associated task performer users may maintain a repository 391 of available tasks for use by those task performer users. If so, the component 393 may use the available task repository 391 in various ways. For example, if a task performer user requests information about available tasks (e.g., via a search request or browse request), the component 393 may in some embodiments provide information about available tasks that are in the repository 391, whether instead of or in addition to information about available tasks available elsewhere (e.g., tasks available on other computing nodes 390). In addition, if a task performer user requests to perform one of the available tasks in the repository 391, the component 393 may control performance of that task, and then return results of the task performance and further control over the task back to another computing node 390 from which temporary control over the task had previously been acquired.

When the component 393 desires to obtain information about tasks that are available on other computing nodes 390, such as in response to a user request or as part of maintaining a supply of available tasks in the repository 391, the component 393 on the computing node 390 may in some embodiments interact directly with one or more other such computing nodes 390 (e.g., by interacting with components 393 on those other computing nodes). Alternatively, in at least some embodiments, the task exchange system may maintain a global repository that stores information about tasks that are available on the various computing nodes 390 (e.g., as part of database 321 on storage 320, such as under control of one or more optional components 347 executing in memory 330), and if so the component 393 on the computing node 390 may interact with that global repository to obtain information about available tasks, whether instead of or in addition to directly interacting with one or more other such computing nodes 390.

In addition, it will be appreciated that the computing nodes 390 may have other forms and/or include other information in other embodiments. For example, while not illustrated here, in some embodiments at least some of the computing nodes 390 that have one or more associated task requester users may maintain information about available tasks supplied by those task requester users (e.g., in a partition 395 on the computing node along with other stored information related to the task requester users), and may further control performance of those tasks by task performer users (e.g., task performer users on other computing nodes) on behalf of those task requester users. In addition, while the illustrated embodiment includes only a single available task repository 391 on a computing node 390, in other embodiments multiple available task repositories may be maintained on a single computing node, such as to correspond to different groups of users associated with that single computing node (e.g., to have a distinct available task repository for each of multiple storage partitions on a computing node, such that a storage partition's available task repository contains tasks that are appropriate for the task performer users whose information is stored in that storage partition; to separate multiple task performer users within one or more storage partitions into multiple groups that each have a distinct associated available task repository, such as by grouping task performer users based on one or more common attributes of the user; etc.). Conversely, in other embodiments a single available task repository 391 may be maintained by, on and/or for multiple computing nodes 390, such as to reflect a group of associated computing nodes.

In addition, in at least some embodiments and for some types of interactions, the system interface 340 may directly handle the interactions without directing the interactions to particular computing nodes 390. For example, the task exchange system may maintain some types of data in a general data repository that is not distributed among the computing nodes 390, such as in a database 321 on storage 320. If so, the system interface 340 may respond to requests to access or change such data directly without using the computing nodes 390. In other embodiments, such general data may not be maintained and used. Furthermore, in some embodiments, the system interface 340 and/or other portions of the task exchange system may optionally be separated into multiple components 347 that each provides one or more distinct types of functionality, although particular such components are not illustrated in this example embodiment.

Those skilled in the art will appreciate that computing systems and nodes 300, 350, 370 and 390 are merely illustrative and are not intended to limit the scope of the embodiments of the present disclosure. The task exchange system may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange system, including by the node software components, may in some embodiments be combined in fewer components or distributed in additional components than is described herein. Similarly, in some embodiments, the functionality of some of the components may not be provided as part of the task exchange system, and/or other additional functionality may be available.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine-readable software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4B:
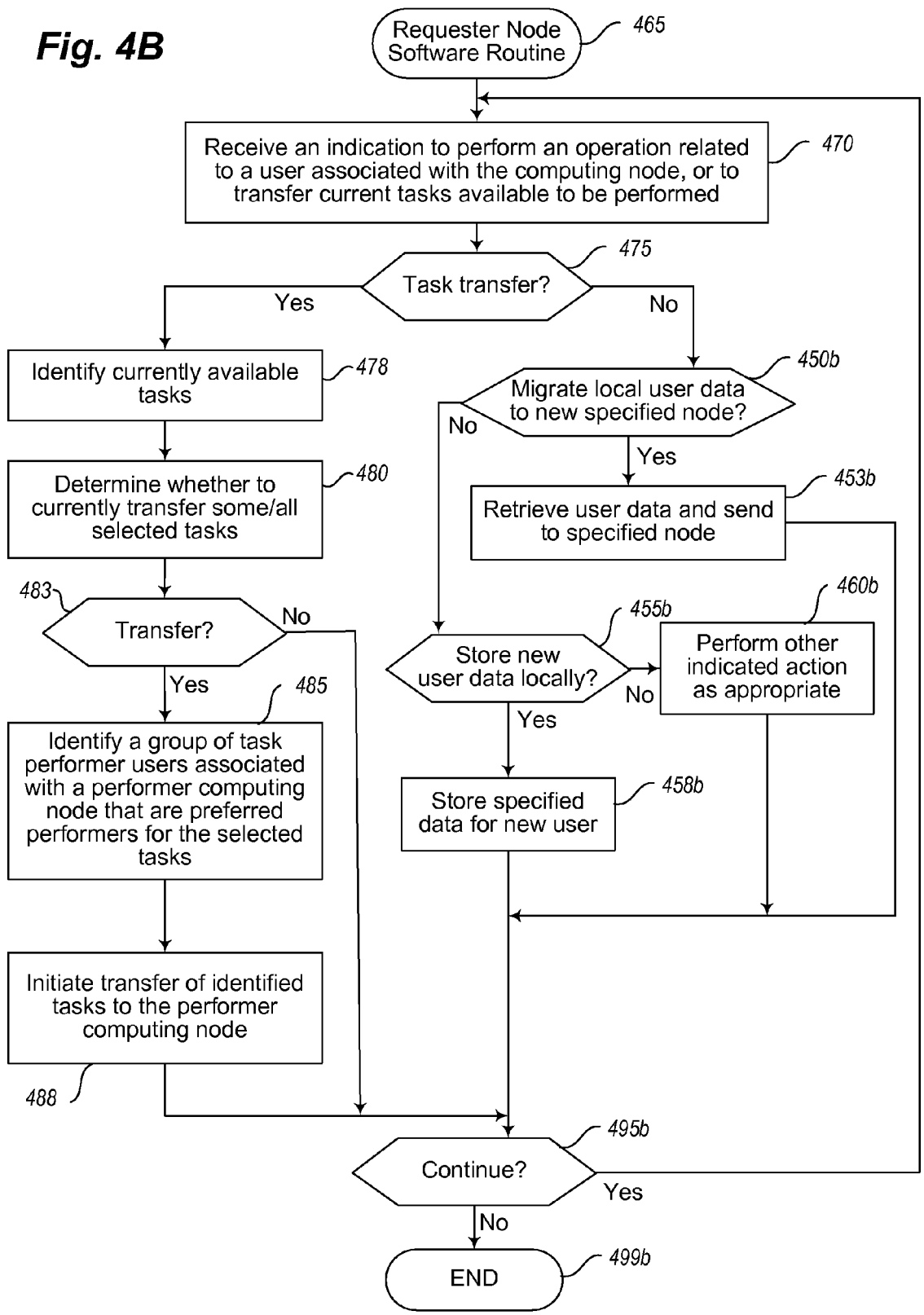

FIGS. 4A and 4B illustrate flow diagrams of example embodiments of Node Software routines. The routines may be provided by, for example, execution of embodiments of software program 215 of FIG. 2 and/or of component 393 of FIG. 3, such as to execute in accordance with one or more computing nodes in order to facilitate access of task performer users to available tasks. In the illustrated embodiment, FIG. 4A illustrates functionality provided by a Node Software routine embodiment that provides functionality to task performer users, such as for a Node Software routine executing on behalf of a performer computing node, while FIG. 4B illustrates functionality provided by a Node Software routine embodiment that provides functionality to task requester users, such as for a Node Software routine executing on behalf of a requester computing node. In addition, in the illustrated embodiment, each computing node may execute a separate instance of the routines in FIG. 4A or 4B to support system-related operations for that computing node, including to interact with a storage partition provided by that computing node. It will be appreciated that in other embodiments a single instance of the Node Software routine may include some or all functionality illustrated in both FIGS. 4A and 4B, such as if a single computing node has associated users that include both task performer users and task requester users. In addition, the routines may in the illustrated embodiment interact with other instances of the routines on other computing nodes in some situations (e.g., to transfer control over tasks between computing nodes, to transfer a group of data related to an entity to another computing node, etc.), while in other embodiments a single instance of one of the routines may support multiple computing nodes and may perform all of the corresponding actions to effect such actions.

The illustrated embodiment in FIG. 4A is of a performer node routine 400 that begins at block 405, where an indication is received to perform an operation related to a user (or other entity) associated with the local computing node that the routine supports (e.g., based on an interaction with the user, with another instance of the routine affiliated with another computing node, or with another component of the task exchange system), or to instead to perform operations to maintain a repository of available tasks for later performance by associated task performer users (e.g., based on expiration of a timer, such as if the maintenance is performed periodically; based on changes associated with the computing node, such as a change in the task performer users associated with the computing node or a change in the quantity of available tasks that are in the repository; based on instructions received from a user or other entity; etc.).

The routine continues to block 410 to determine whether the received indication is to maintain the repository of available tasks, and if so proceeds to block 415 to identify the task performer users who are currently associated with the computing node. In block 420, the routine then retrieves stored data for the task performer users that is related to the affinities of those task performer users for tasks to perform, such as information about previously performed tasks and/or and user preferences. In block 425, the routine then analyzes the data retrieved in block 420 to determine target task information for the task performer users, such as a quantity of tasks and/or one or more types of tasks that the task performer users are likely to perform over a future period of time. In block 430, the routine then determines the tasks (if any) that are currently in the local available task repository for the computing node. In other embodiments, some or all of blocks 415-430 may not be performed each time that the repository of available tasks is maintained, such as if the maintenance is performed frequently but the types of information determined for the non-performed blocks changes significantly only infrequently.

After block 430, the routine continues to block 435 to identify available tasks on other computing nodes that satisfy the determined target task information, and in block 440 initiates the transfer of the identified tasks to the local available task repository. The initiating of the transfer of the identified tasks may include, for example, interacting with the computing nodes that currently have control over those tasks in order to obtain that control (e.g., for a temporary time), and storing information about the transferred tasks in the local available task repository for later use by the task performer users associated with the computing node.

If it is instead determined in block 410 that the received indication in block 405 is not to maintain the repository of available tasks, the routine continues to block 450a to determine whether the operation indicated in block 405 is to migrate or otherwise transfer data related to an indicated task performer user to another computing node, such as to facilitate the indicated user's access to available tasks that are controlled by the other computing node. If so, the routine continues to block 453a to retrieve the stored data for the indicated user, send the retrieved data to the specified node, and update task exchange system information so that the indicated user will be affiliated with the specified node. In addition, the routine may in some embodiments delete the retrieved data from the storage partition on the computing node, such as if it is desired to maintain a single copy of the data for the entity. While not illustrated here, it will be appreciated that in at least some embodiments, access by other routines to the data related to the user may be temporarily blocked while the routine performs block 453a and the other instance of the routine receives and stores the user data, so as to prevent race conditions and other situations of concurrent access to the same data. Furthermore, in at least some embodiments the operations described with respect to block 453a may be performed via use of the Data Transfer routine 500 of FIG. 5.

If the operation indicated in block 405 is not to migrate or otherwise transfer data related to an indicated user to another computing node, the routine continues instead to block 455a to determine whether the operation indicated in block 405 is to store new data for a user in a storage partition on the computing node, such as user data sent from another instance of the routine that is transferring user-related data to the computing node, or new data provided by the user. If so, the routine continues to block 458a to store the specified data for the user, and if not the routine continues to block 460a to perform another indicated operation as appropriate, including using the local available task repository as appropriate. For example, the indicated operation may include a request from a task performer user to search for or browse for available tasks, and if so the routine may respond by providing information about available tasks in the local available task repository, whether instead of or in addition to information about available tasks that are not in the local available task repository (e.g., information retrieved from a global repository of information about available tasks). Similarly, the indicated operation may include a request from a task performer user to perform a particular available task that is in the local available task repository or to perform an available task of a particular type of which one or more available tasks are accessible in the local available task repository, and if so the routine may respond by controlling performance by the task performer user of a task in the local available task repository. In addition, the indicated operation may include a request from a task performer user to perform a particular available task that is not in the local available task repository, and if so the routine may respond by interacting with a remote computing node (or other store of task information) to obtain and provide information to the task performer user to facilitate performance of the task (e.g., with the task performance occurring under control of the remote computing node, or instead under control of the local computing node based on a temporary transfer of control provided by the remote computing node for the particular task performer user). In addition, if the task transfers that are initiated in block 440 include sending requests to other computing nodes but not waiting for responses, task information that is later received from other such computing nodes may be received and handled in block 460a. A variety of other types of operations related to other aspects of the task exchange system functionality may similarly be performed.

After blocks 440, 453a, 458a or 460a, the routine continues to block 495a to determine whether to continue. If so, the routine returns to block 405, and if not continues to block 499a and ends.

The illustrated embodiment in FIG. 4B is of a requester node routine 465 that begins at block 470, where an indication is received to perform an operation related to a user (or other entity) associated with the local computing node that the routine supports (e.g., based on an interaction with the user, with another instance of the routine affiliated with another computing node, or with another component of the task exchange system), or to instead to perform operations related to transferring tasks supplied by local associated task requester users to other remote computing nodes for performance by task performer users on those remote computing nodes (e.g., based on expiration of a timer, such as if the operations are performed periodically; based on changes associated with the computing node, such as a change in the local available tasks supplied by the associated task requester users; based on instructions received from a user or other entity; etc.).

The routine continues to block 475 to determine whether the received indication is to perform operations related to transferring local available tasks, and if so proceeds to block 478 to identify local tasks that are currently available. In block 480, the routine then determines whether to currently transfer any selected tasks from the identified local tasks, such as some or all of the identified local tasks. If in block 483 it is determined to transfer selected tasks, the routine continues to block 485 to identify a group of task performer users who are desired or otherwise appropriate to perform the selected tasks, such as a group of task performer users associated with a particular remote computing node. As discussed in greater detail elsewhere, such task performer users may be identified in various manners, including by analyzing various information about the selected tasks and/or various task performer users of the task exchange system, and various criteria may be used to determine appropriateness of task performer users for tasks.

In block 488, the routine then initiates the transfer of the selected tasks to the remote computing node(s) with which the identified group of task performer users are associated. The initiating of the transfer of the selected tasks to a remote computing node may include, for example, interacting with the remote computing node so that the remote computing node assumes control over performance of the selected tasks (e.g., for a temporary time), such as for that remote computing node to add the selected tasks to an available task repository on that remote computing node, and sending information about the selected tasks to the remote computing node. While the illustrated embodiment of the routine transfers all of the selected tasks to a single group of task performer users, in other embodiments the routine may instead separate the selected tasks into multiple groups that each have a subset of the selected tasks, and transfer each subset of tasks to one or more remote computing nodes associated with a group of task performer users that are selected for that subset of tasks.

If it is instead determined in block 475 that the received indication in block 470 is not to perform operations related to transferring local available tasks, the routine continues to block 450b to determine whether the operation indicated in block 470 is to migrate or otherwise transfer data related to an indicated task requester user to another computing node, such as to enable the other computing node to facilitate access by appropriate task performer users to tasks supplied by the indicated user. If it is determined in block 450b that the indicated operation is to migrate or otherwise transfer data related to an indicated task requester user to another computing node, the routine continues to block 453b to retrieve and send the stored data for the indicated user to the specified node. Blocks 450b-458b of FIG. 4B are performed in a manner similar to blocks 450a-458a of FIG. 4A, and thus are described in less detail here for the sake of brevity. Furthermore, in at least some embodiments the operations described with respect to block 453b may be performed via use of the Data Transfer routine 500 of FIG. 5.

If the operation indicated in block 470 is not to migrate or otherwise transfer data related to an indicated user to another computing node, the routine continues instead to block 455b to determine whether the operation indicated in block 470 is to store new data for a user in a storage partition on the computing node. If so, the routine continues to block 458b to store the specified data for the user, and if not the routine continues to block 460b to perform another indicated operation as appropriate, such as to provide various types of task exchange system functionality to associated task requester users in response to their requests.

After blocks 488, 453b, 458b or 460b, the routine continues to block 495b to determine whether to continue. If so, the routine returns to block 405, and if not continues to block 499b and ends.

Figure 5:
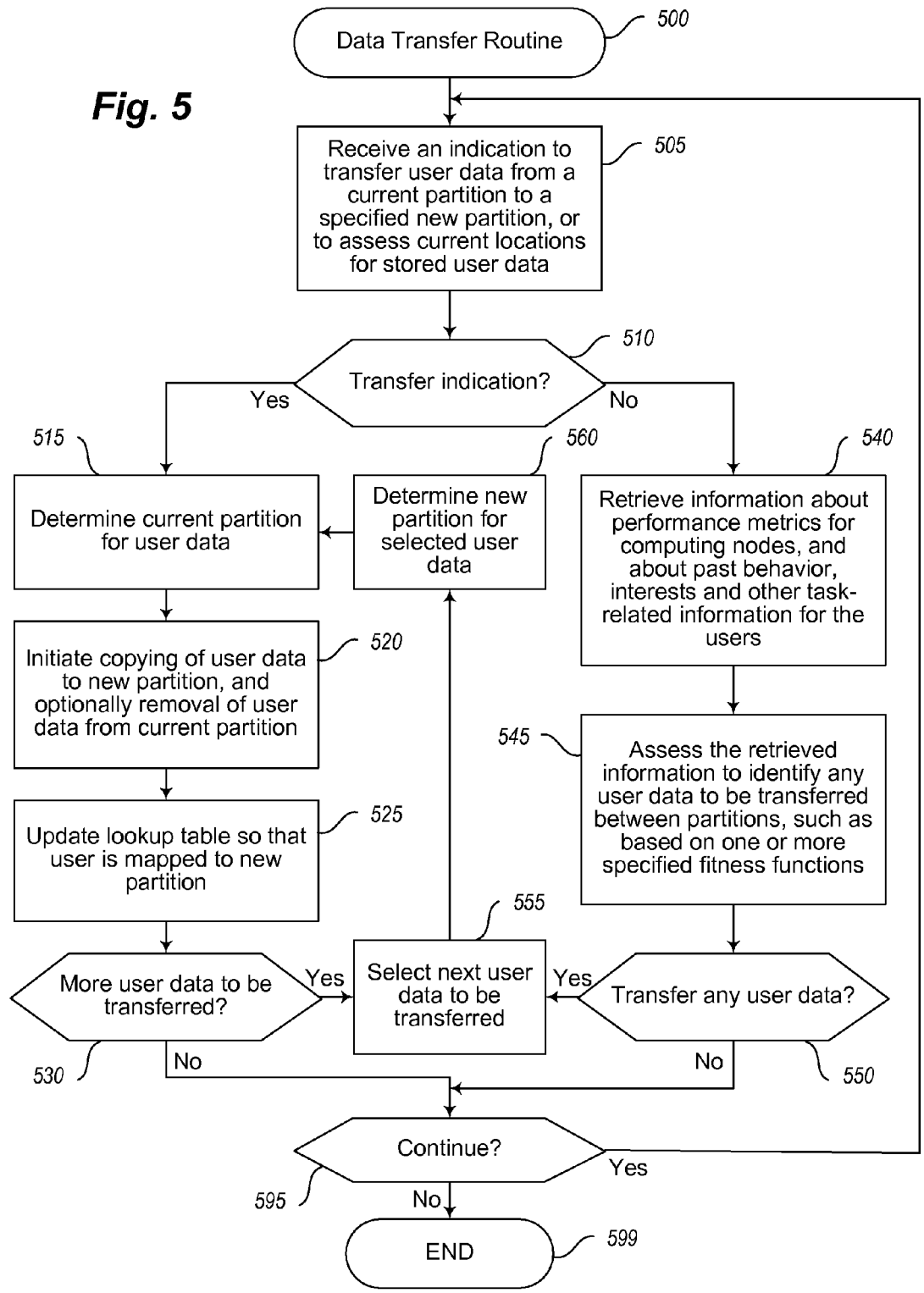
FIG. 5 illustrates a flow diagram of an example embodiment of a Data Transfer routine.

FIG. 5 is a flow diagram of an example embodiment of a Data Transfer routine 500. The routine may be provided by, for example, execution of a data transfer component of the task exchange system 115 of FIG. 1 and/or of the task exchange system interface 340 of FIG. 2, such as to migrate or otherwise transfer data from a current storage partition or other data storage location to a new other storage partition or other data storage location. In addition, in at least some embodiments the transfer of data for a user may be initiated by a node software component 215 of FIG. 2 and/or node software component 393, as previously described with respect to FIGS. 4A and 4B.

The illustrated embodiment of the routine 500 begins at block 505, where an indication is received to transfer one or more groups of user data from a current storage partition to a specified new storage partition, or to assess current storage partition locations that store user data to determine whether to perform any such user data transfers (e.g., based on periodically performing such assessment, or instead as triggered by a change in some factor related to current or new storage partitions). The routine continues to block 510 to determine whether an indication to perform a particular user data transfer was received. If so, the routine continues to block 515 to determine a current storage partition for the user data, selecting a first user data group if multiple user data groups were indicated in block 505. The routine then continues to block 520 to initiate copying of the group of user data to the new storage partition (e.g., by transferring the group of user data to a remote computing node that provides the new storage partition), and to optionally also remove the user data group from the storage partition where it had been stored. In block 525, the routine then updates a system-wide lookup table or other mapping to associate the user with the new storage partition, and continues to block 530 to determine whether there are more groups of user data to be transferred. If so, the routine continues to block 555 to select the user group of user data to be transferred, and if not continues to block 595.

If it is instead determined in block 510 that a particular transfer indication was not received, the routine continues to block 540 to retrieve information about current storage partitions and user activities, such as to include performance metrics for computing nodes (e.g., levels of usage of memory, storage, network bandwidth, I/O access, etc.), information about past behavior of users (e.g., in supplying tasks, performing tasks, etc.), information about expected future behavior of users (e.g., in tasks that will be supplied or performed), etc. In block 545, the routine then assesses the retrieved information to identify zero or more groups of user data to be transferred to new storage partitions, such as based on a specified fitness function that weighs multiple factors. Such data transfer migrations may be performed for a variety of reasons, including to group related task performer users together. The routine then continues to block 550 to determine whether any groups of user data were identified to be transferred. If so, the routine continues to block 555 to select the next group of user data to be transferred, beginning with the first, and if not continues to block 595. After block 555, the routine continues to block 560 to determine the new partition for the currently selected group of user data, such as is specified in block 505 or determined in block 560, and then proceeds to block 515.

In block 595, the routine determines whether to continue to transfer groups of user data. If so, the routine returns to block 505, and if not continues to block 599 and ends.

It will be appreciated that the task exchange system may further have other components that provide a variety of other types of functionality as part of the operation of the task exchange system, but that are not described in detail here.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for providing access to tasks that are available to be performed, the method comprising:

identifying, by one or more configured computing systems of a task exchange system that facilitates performance by a plurality of task performer users of tasks supplied by multiple task requester users, a group of multiple task performer users who are associated with a first computing node of multiple alternative computing nodes of the task exchange system, each of the plurality of task performer users and each of the multiple task requester users being associated with one of the multiple computing nodes that stores data for that user, and each available task to be performed being associated with one of the multiple computing nodes that controls performance of the task; and providing, by the one or more configured computing systems, a supply of available tasks to the first computing node for later performance by the identified group of task performer users, by:

determining one or more types of tasks that the identified group of task performer users has an affinity for performing, the determining being based at least in part on prior performance of tasks by those task performer users via the task exchange system;

identifying tasks of the determined one or more types that are available to be performed and that are currently associated with one or more computing nodes of the multiple computing nodes other than the first computing node;

before any of the multiple task performer users have requested to perform any of the identified tasks, initiating a transfer of the identified tasks to the first computing node, to enable the transferred identified tasks to be accessible for later performance by the group of multiple task performer users via interactions with the first computing node to request the performance, the transfer such that the transferred identified tasks become associated with the first computing node; and after the initiating of the transfer of the identified tasks, receiving a request from one of the multiple task performer users to perform one or more of the identified tasks, and providing information to the one task performer user related to the one or more identified tasks.

2. The method of claim 1 wherein the transfer of the identified tasks to the first computing node includes transferring control over performance of the identified tasks to the first computing node for at least a temporary period of time, and wherein the transferred identified tasks are maintained in a local repository on the first computing node so as to be accessible only to the identified group of task performer users during the at least temporary period of time.

3. The method of claim 1 further comprising, after receiving the request from the one task performer user and under control of the first computing node, assigning the requested one or more transferred identified tasks to the one task performer user for performance.

4. The method of claim 1 further comprising, after transfer of the identified tasks to the first computing node and under control of the first computing node, receiving a second request from a second of the task performer users of the identified group for information regarding one or more available tasks of interest, and responding to the request by providing information to the second task performer user about one or more of the transferred identified tasks.

5. The method of claim 4 wherein the received second request includes one or more criteria for use in identifying the one or more available tasks of interest, wherein the one or more transferred identified tasks satisfy the included criteria and wherein one or more other available tasks satisfy the included criteria, the other available tasks being associated with one or more computing nodes other than the first computing node, and wherein the responding to the second request includes favoring the transferred identified tasks by excluding information about at least some of the other available tasks from the information provided to the second task performer user.

6. The method of claim 4 wherein the received second request includes one or more criteria for use in identifying the one or more available tasks of interest, wherein the one or more transferred identified tasks satisfy the included criteria and wherein one or more other available tasks satisfy the included criteria, the other available tasks being associated with one or more computing nodes other than the first computing node, and wherein the responding to the second request includes favoring the transferred identified tasks in the information provided to the second task performer user by emphasizing information about the one or more transferred identified tasks relative to information about at least some of the other available tasks.

7. The method of claim 1 wherein the providing of the supply of available tasks to the first computing node for later performance by the identified group of task performer users is performed under control of the first computing node.

8. The method of claim 7 wherein the first computing node is a performer computing node that provides functionality for the task exchange system to the multiple task performer users who are associated with the first computing node.

9. The method of claim 1 wherein the providing of the supply of available tasks to the first computing node for later performance by the identified group of task performer users is performed under control of the one or more computing nodes.

10. The method of claim 9 wherein one or more task requester users are associated with the one or more computing nodes, and wherein the identified tasks are supplied by the one or more task requester users, such that information about the identified tasks is stored with information for the one or more task requester users on the one or more computing nodes.

11. The method of claim 9 wherein the one or more computing nodes are requester computing nodes that provide functionality for the task exchange system to multiple task requester users who are associated with the one or more computing nodes.

12. The method of claim 1 wherein the determining of the one or more types of tasks that the identified group of multiple task performer users has an affinity for performing includes, for each of at least one task type, calculating an aggregate probability that the identified group of multiple task performer users will collectively perform a selected number of tasks of that task type over a predetermined future period of time, and wherein the one or more determined task types are automatically selected based at least in part on the calculated aggregate probabilities.

13. The method of claim 1 wherein the determining of the one or more types of tasks that the identified group of multiple task performer users has an affinity for performing includes analyzing information specific to those task performer users to identify types of tasks that the multiple task performer users of the identified group are collectively likely to perform within a selected future period of time.

14. The method of claim 13 wherein the determining of the one or more types of tasks that the identified group of multiple task performer users has an affinity for performing further includes analyzing the information specific to those task performer users to determine a quantity of tasks of the one or more determined task types that the multiple task performer users of the identified group are collectively likely to perform within the future period of time, and wherein the identifying of the tasks is further performed to identify a quantity of available tasks that is based on the determined quantity.

15. The method of claim 13 wherein the information specific to the task performer users of the identified group that is analyzed includes information about the prior performance of tasks by those task performer users via the task exchange system.

16. The method of claim 13 wherein the information specific to the task performer users of the identified group that is analyzed includes one or more types of reputation information for those task performer users that is based on prior activities of those task performer users other than performance of tasks.

17. The method of claim 13 wherein the information specific to the task performer users of the identified group that is analyzed includes preferences previously specified by at least some of the task performer users.

18. The method of claim 1 wherein the determining of the one or more types of tasks that the identified group of multiple task performer users has an affinity for performing includes analyzing the prior performance of tasks by those task performer users to identify types of tasks such that the multiple task performer users of the identified group are collectively likely to successfully complete performance of tasks of the identified types within a future period of time.

19. The method of claim 1 wherein the determining of the one or more types of tasks that the identified group of multiple task performer users has an affinity for performing includes analyzing the prior performance of tasks by those task performer users to identify types of tasks such that task requester users who supply tasks of the identified types are collectively likely to approve results of performance of those supplied tasks by the multiple task performer users of the identified group.

20. The method of claim 1 wherein the identifying of the tasks that are currently associated with the one or more other computing nodes includes interacting with the one or more other computing nodes to obtain information about the identified tasks.

21. The method of claim 1 wherein the task exchange system maintains a global repository of information about available tasks that are associated with multiple requester computing nodes, and wherein the identifying of the tasks includes obtaining information from the global repository about the identified tasks and about other tasks.

22. The method of claim 1 wherein the providing of the supply of available tasks to the first computing node for later performance by the identified group of task performer users is repeatedly performed to provide a supply of available tasks for a future amount of time after the providing.

23. The method of claim 1 further comprising, before the identifying of the group of multiple task performer users who are associated with the first computing node, determining to transfer one or more of the multiple task performer users to the first computing node from one or more other computing nodes such that the transferred one or more task performer users become associated with the first computing node, the determining to transfer the one or more task performer users being based at least in part on a determination that the one or more task performer users have affinities for performing tasks that are similar to affinities for performing tasks of other of the multiple task performer users already associated with the first computing node.

24. The method of claim 1 further comprising, before the identifying of the group of multiple task performer users who are associated with the first computing node, determining to transfer one or more of the multiple task performer users to the first computing node from one or more other computing nodes such that the transferred one or more task performer users become associated with the first computing node, the determining to transfer the one or more task performer users being based at least in part on a determination that the one or more task performer users have proficiencies for performing tasks that are similar to proficiencies for performing tasks of other of the multiple task performer users already associated with the first computing node.

25. The method of claim 1 wherein the determining of the one or more types of tasks that the identified group of multiple task performer users has an affinity for performing includes determining that the identified group of multiple task performer users at the first computing node are at least part of a hot spot for preferred performance of tasks of at least one of the determined task types.

26. The method of claim 1 wherein the identified group of task performer users associated with the first computing node is a subset of all task performer users associated with the first computing node, and wherein the identifying of the group of multiple task performer users further includes selecting the multiple task performer users of the identified group based on one or more shared attributes of those task performer users related to performing tasks.

27. The method of claim 1 wherein the multiple computing nodes each include one or more computing systems distinct from computing systems of the other computing nodes.

28. The method of claim 1 wherein the one or more configured computing systems provide the task exchange system and further facilitate transactions between the plurality of task performer users and the multiple task requester users involving multiple available tasks of multiple types to be performed, the task performer users having varying qualifications and varying proficiencies for performing varying types of tasks.

29. A non-transitory computer-readable medium having stored contents that when accessed by a computing system configure the computing system to facilitate access to tasks, by performing a method comprising:

identifying multiple task performer users who are associated with a first of multiple computing nodes of a task exchange system;

identifying tasks that the multiple task performer users have an affinity for performing and that are available to be performed via the task exchange system, the identified tasks being associated with one or more of the multiple computing nodes other than the first computing node;

before the multiple task performer users have requested to perform the identified tasks, initiating a transfer of the identified tasks to the first computing node, so that the identified tasks are available to be later performed by the multiple task performer users; and after the identified tasks have been transferred to the first computing node, receiving a request from one of the multiple task performer users to perform one or more of the identified tasks, and initiating performance of the one or more identified tasks by the one task performer user.

30. The non-transitory computer-readable medium of claim 29 wherein the identifying of the tasks that the multiple task performer users have an affinity for performing includes analyzing prior performance of tasks by those task performer users to determine tasks that the multiple task performer users are collectively likely to perform within a predetermined future period of time.

31. The non-transitory computer-readable medium of claim 29 wherein the computing system supports the task exchange system to facilitate performance by task performer users of tasks supplied by task requester users, the multiple computing nodes of the task exchange system being alternative computing nodes that each provides functionality to and stores data for an associated subset of the task requester users and task performer users of the task exchange system in a distributed manner.

32. The non-transitory computer-readable medium of claim 29 wherein the computer-readable medium is a memory of the computing system.

33. The non-transitory computer-readable medium of claim 29 wherein the contents are instructions that when executed program the computing system to perform the method.

34. A computing system configured to facilitate access to tasks, comprising:

one or more memories; and
one or more components that are configured to:
identify multiple task performer users who are associated with a first of multiple computing nodes of a task exchange system;
automatically identify tasks for which the multiple task performer users are determined to have an affinity based at least in part on prior performance of tasks by those task performer users, the identified tasks being available to be performed via the task exchange system and being currently associated with one or more of the computing nodes other than the first computing node;
before the multiple task performer users have requested to perform the identified tasks, automatically initiate a change in association of the identified tasks such that the identified tasks become associated with the first computing node, so as to make the identified tasks accessible to be later performed by the multiple task performer users via interactions with the first computing node; and
after the initiating of the change in association of the identified tasks, receiving a request from one of the multiple task performer users to perform one or more of the identified tasks, and providing information to the one task performer user related to the one or more identified tasks.

35. The computing system of claim 34 further comprising the multiple computing nodes, and wherein one or more of the multiple computing nodes each includes multiple physical computing systems.

36. The computing system of claim 34 wherein the one or more components operate under control of the first computing node, and wherein the automatic identifying of the tasks for which the multiple task performer users have an affinity includes analyzing the prior performance of tasks by those task performer users so as to determine tasks that the multiple task performer users are collectively likely to perform in a future period of time.

37. The computing system of claim 34 wherein the identified tasks are currently identified with a second computing node, wherein the one or more components operate under control of the second computing node, and wherein the automatic identifying of the tasks for which the multiple task performer users have an affinity includes analyzing the prior performance of tasks by those task performer users so as to determine that the multiple task performer users are collectively likely to perform the tasks with at least a determined level of proficiency.

38. The computing system of claim 34 wherein the one or more components are part of the task exchange system and include software instructions for execution by the computing system.

39. The computing system of claim 34 wherein the one or more components consist of a means for identifying multiple task performer users who are associated with a first of multiple computing nodes of a task exchange system, for automatically identifying tasks for which the multiple task performer users are determined to have an affinity based at least in part on prior performance of tasks by those task performer users, the identified tasks being available to be performed via the task exchange system and being currently associated with one or more of the computing nodes other than the first computing node, and for, before the multiple task performer users have requested to perform the identified tasks, automatically initiating a change in association of the identified tasks such that the identified tasks become associated with the first computing node, so as to make the identified tasks accessible to be later performed by the multiple task performer users via interactions with the first computing node.

* * * * *